United States Patent
Smith et al.

(10) Patent No.: US 8,065,376 B2
(45) Date of Patent: *Nov. 22, 2011

(54) SYSTEM AND METHOD FOR INTEGRATING ELECTRONIC MAIL ACCOUNTS

(75) Inventors: Christopher D. Smith, Burlington (CA); David P. Kruis, Kitchener (CA); Robert J. Snow, Edmonton (CA); Snezana Visnjic-Obucina, Etobicoke (CA); Albert Lee, Oakville (CA); Arsel Manuel, Mississauga (CA); Diana G. Vitorino, Toronto (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/691,409

(22) Filed: Jan. 21, 2010

(65) Prior Publication Data

US 2010/0125642 A1 May 20, 2010

Related U.S. Application Data

(63) Continuation of application No. 10/640,449, filed on Aug. 13, 2003, now Pat. No. 7,730,136.

(60) Provisional application No. 60/403,633, filed on Aug. 16, 2002.

(51) Int. Cl.
  *G06F 15/16* (2006.01)
(52) U.S. Cl. ........... 709/206; 709/225; 709/229; 705/75
(58) Field of Classification Search .................. 709/206, 709/225, 229; 705/75
See application file for complete search history.

(56) References Cited

U.S. PATENT DOCUMENTS

| | | | |
|---|---|---|---|
| 5,956,486 | A | 9/1999 | Hickman et al. |
| 5,968,117 | A | 10/1999 | Schuetze |
| 5,987,498 | A | 11/1999 | Athing et al. |
| 6,389,455 | B1 | 5/2002 | Fuisz |
| 6,734,878 | B1 | 5/2004 | DeLuca et al. |
| 2001/0032245 | A1 | 10/2001 | Fodor |
| 2002/0023138 | A1 | 2/2002 | Quine et al. |
| 2003/0145059 | A1 | 7/2003 | Burgard et al. |

(Continued)

FOREIGN PATENT DOCUMENTS

EP 0 772 327 A2 5/1997

(Continued)

OTHER PUBLICATIONS

EPO: Communication pursuant to Article 94(3) EPC dated Feb. 4, 2010 for European Patent Application 03 787 553.1-2221, citing WO 01/71539 A2 (10 pages).

(Continued)

*Primary Examiner* — John Follansbee
*Assistant Examiner* — Glenford Madamba
(74) *Attorney, Agent, or Firm* — Jones Day

(57) ABSTRACT

In accordance with the teachings described herein, systems and methods are provided for integrating a plurality of electronic mail (email) accounts. A plurality of email services may be used to send and receive electronic messages over a wide area network, one of the email services being a preferred email service and another of the email services being a secondary email service. An email integration service may be used that is coupled to the wide area network and that is independent of the plurality of email services. The email integration service may be operable to receive account information regarding the preferred email service and the secondary email service and use the account information to configure a means for forwarding electronic messages from the preferred email service to the secondary email service.

21 Claims, 6 Drawing Sheets

U.S. PATENT DOCUMENTS

2004/0088357 A1  5/2004  Harding

FOREIGN PATENT DOCUMENTS

| | | | |
|---|---|---|---|
| EP | 1 195 957 | A1 | 4/2002 |
| WO | 01/59985 | A2 | 8/2001 |
| WO | 01/71539 | A2 | 9/2001 |

OTHER PUBLICATIONS

EPO: Extended European Search Report for European Patent Application No. 10185659.9-2221 dated Mar. 15, 2011 (10 pages).

Miller J G et al: "Accessing Messages Your Way", AT&T Technology, American Telephone & Telegraph Co., Short Hills, NJ, US, vol. 10, No. 1, Mar. 21, 1995, XP000530274 (4 pages).

SYSTEM AND METHOD FOR INTEGRATING ELECTRONIC MAIL ACCOUNTS

CROSS-REFERENCE TO RELATED APPLICATION

This is a continuation of U.S. patent application Ser. No. 10/640,449, filed on Aug. 13, 2003, which claims priority from and is related to the following prior application: "System and method of integrating email accounts," U.S. Provisional Application No. 60/403,633, filed Aug. 16, 2002. These prior applications, including the entire written description and drawing figures, are hereby incorporated into the present application by reference.

FIELD

The technology described in this patent document relates generally to the field of electronic mail systems. More particularly, the patent document describes a system and method for integrating electronic mail accounts.

BACKGROUND

Electronic mail (email) systems typically include a plurality of email services, each of which may receive and store email messages for a plurality of users. When an email service stores email messages sent to a particular email user, that user is said to have an email account with the service. Each email account has at least one associated email address, which may be used to send email to that account.

FIG. 1 is a block diagram of a typical email system. The illustrated email system includes a webmail service 102, an Internet Service Provider (ISP) email service 104, a mail transfer service 110 and preferred email service 114 that communicate over a wide area network, such as the Internet 108. An email service 102, 104, 114 is typically used to receive and store email, and a mail transfer service 110 is typically used to send email.

The ISP email service 104 is an email service hosted by an Internet Service Provider (ISP). An ISP email service 104 is typically accessed using an email client 106. The webmail service 102 is an email service that is accessible via the World Wide Web (WWW). A webmail service 102 allows a user to access email stored by the service using a web client, such as a web browser 100. In addition, if a single email user has accounts with multiple email services, then one such email service may be the user's preferred email service 114. The preferred email service 114 may thus be any type of email service, such as a webmail service or an ISP email service, and may be accessed with an email client 116. For the purposes of this patent document, all email services other than the user's preferred email service 114 may be referred to as "secondary email services."

The email client 116 may, for example, be a personal computer, a mobile communication device (see, e.g., FIG. 6), or some other type of email-enabled platform.

The mail transfer service 110 may, for example, be a server which implements the Simple Mail Transfer Protocol (SMTP). An email sender 112, such as a commercially available email program, may be used to access a mail transfer service 110 in order to send email.

In operation, when an email sender 112 requests the mail transfer service 110 to send an email message, the mail transfer service 110 contacts a destination email service 102, 104, 114 via the Internet 108. In this example, the destination service may be the webmail service 102, the ISP email service 104, or the preferred email service 114. It should be understood, however, that other email system topologies are possible in addition to that illustrated in FIG. 1. For example, the email services 102, 104, 114 and the mail transfer service 110 shown in FIG. 1 are separate and distinct services. In other embodiments, however, an email service may be configured to implement a protocol, such as SMTP, so that it may also function as a mail transfer service.

When an email user has email accounts with multiple email services, it may be inconvenient for the user to access all of the email sent to each account. It may be especially inconvenient if one of the user's email services can be accessed from a type of email client 100, 106, 116 that is not available to other services. For example, the user's preferred email service 114 may be accessible by a wireless mobile communication device (see, e.g., FIG. 6), while the user's secondary email service(s) are not accessible wirelessly. In addition, it may be confusing for a person to send an email message to an email user who has multiple email accounts. The person wishing to send the email message may not know to which of multiple email services is preferred by the email recipient

SUMMARY

In accordance with the teachings described herein, systems and methods are provided for integrating a plurality of electronic mail (email) accounts. A plurality of email services may be used to send and receive electronic messages over a wide area network, one of the email services being a preferred email service and another of the email services being a secondary email service. An email integration service may be used that is coupled to the wide area network and that is independent of the plurality of email services. The email integration service may be operable to receive account information regarding the preferred email service and the secondary email service and use the account information to configure a means for forwarding electronic messages from the preferred email service to the secondary email service.

DETAILED DESCRIPTION

Figure 1:
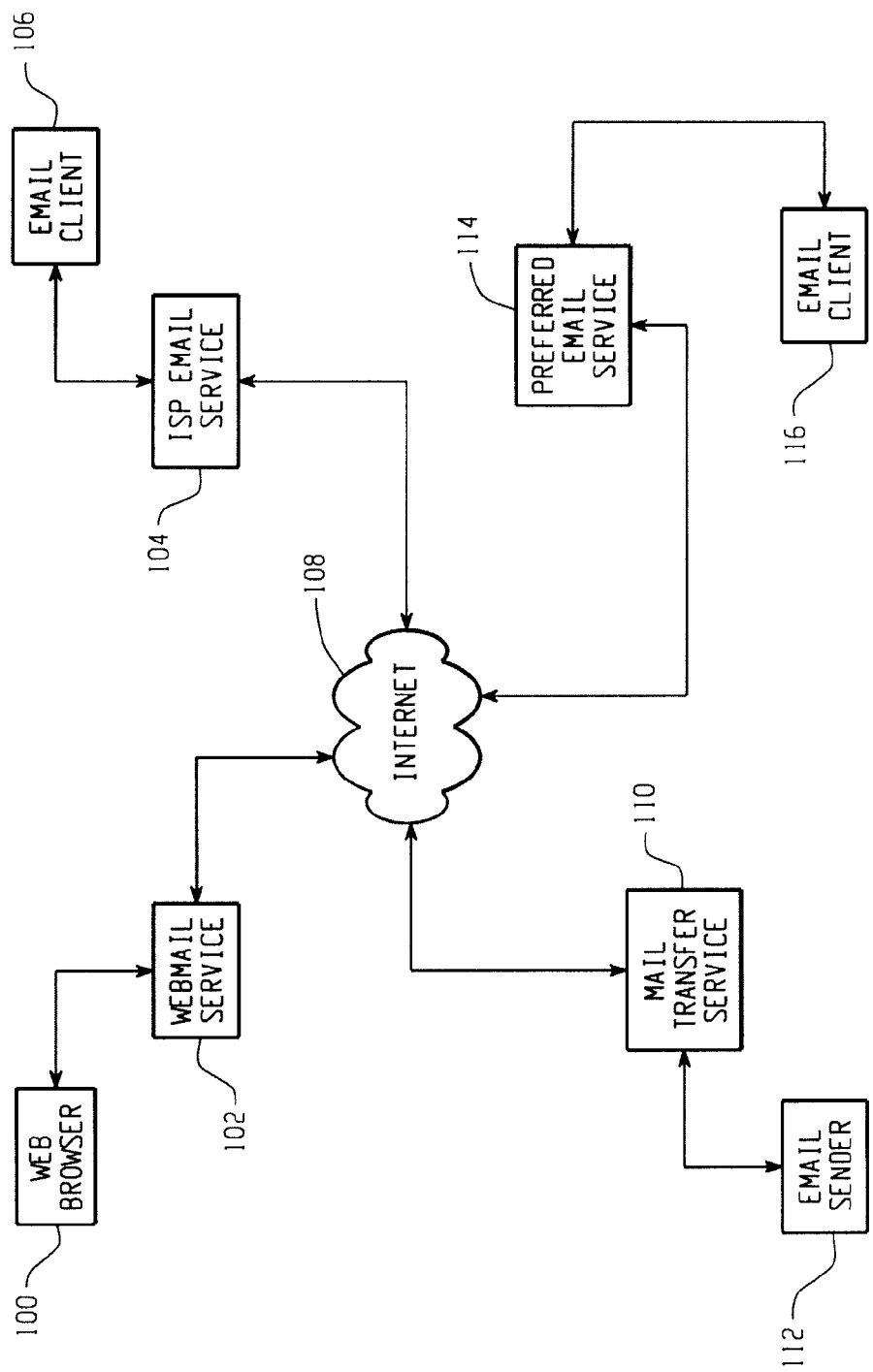
FIG. 1 is a block diagram of a typical electronic mail system.
Figure 2:
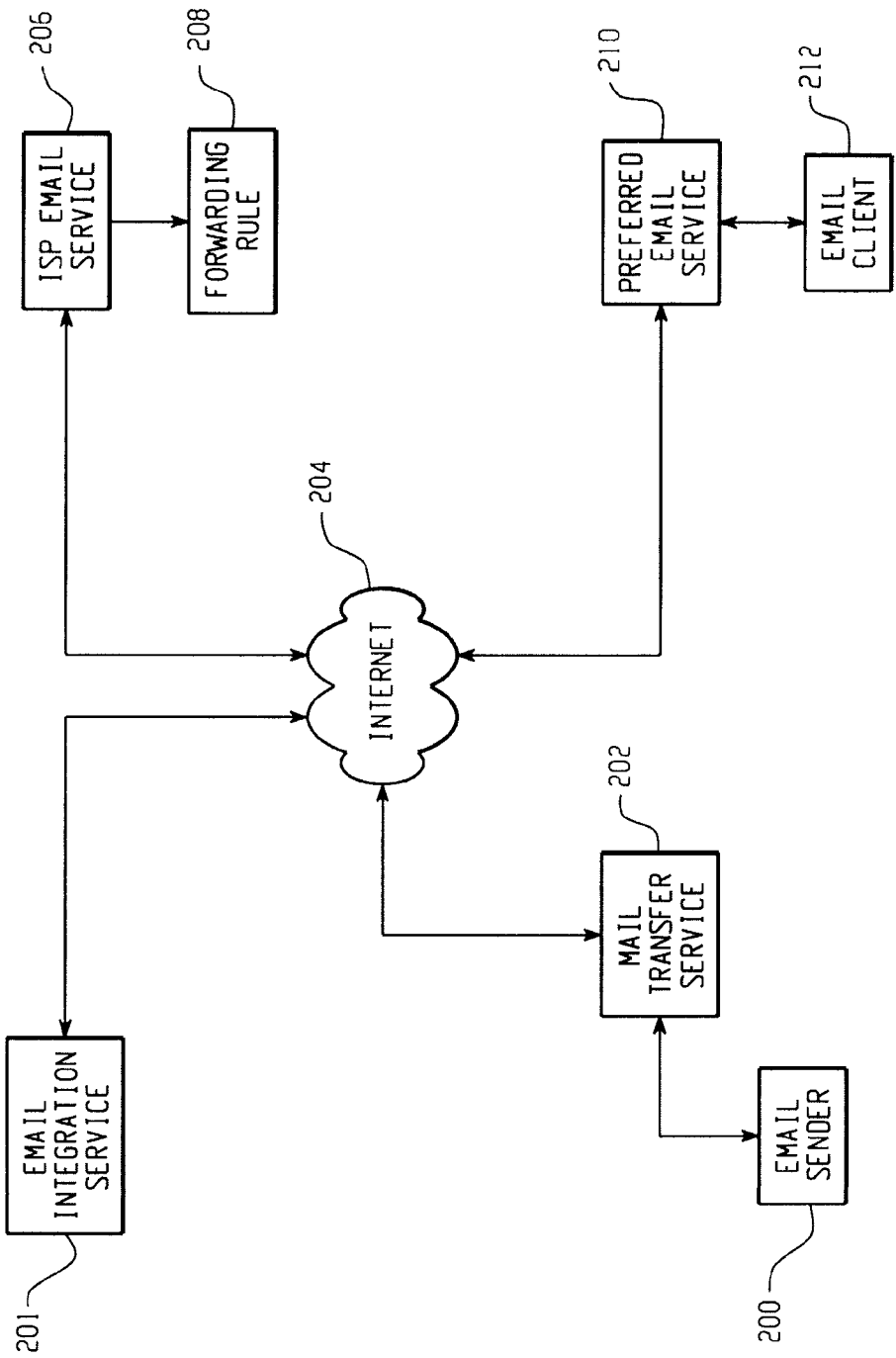
FIG. 2 is a block diagram showing an example electronic mail forwarding system.

With reference now to the remaining drawing figures, FIG. 2 is a block diagram of an example email forwarding system for automatically forwarding email to a preferred email service 210. In this system, a forwarding rule 208 is included for the ISP email service 206 that instructs the ISP email service 206 to redirect email to a preferred email service 210.

In operation, when a mail transfer service 202 sends an email on behalf of an email sender 200 via the Internet 204 to the ISP email service 206, the ISP email service 206 checks for a forwarding rule 208 for the email recipient. If a forwarding rule 208 is located by the ISP email service 206, then the ISP email service 206 sends the email message via the Internet 204 to the preferred email service 210, which is specified by an email address in the forwarding rule 208. Thus, the email recipient does not have to access the ISP email service 206 directly to receive mail, but rather may receive all email through her preferred email service 210.

Once the forwarding rule 208 has been established, email may preferably be forwarded to the preferred email service 210 without any input from the email recipient. To set up the forwarding rule 208, the email recipient may supply information regarding her email accounts to an email integration service 201. The email integration service 201 may then contact the ISP email service 201 via the Internet 204 to establish the forwarding rule 208. Further detail of the email integration service 201 is provided below with reference to FIG. 4.

Figure 3:
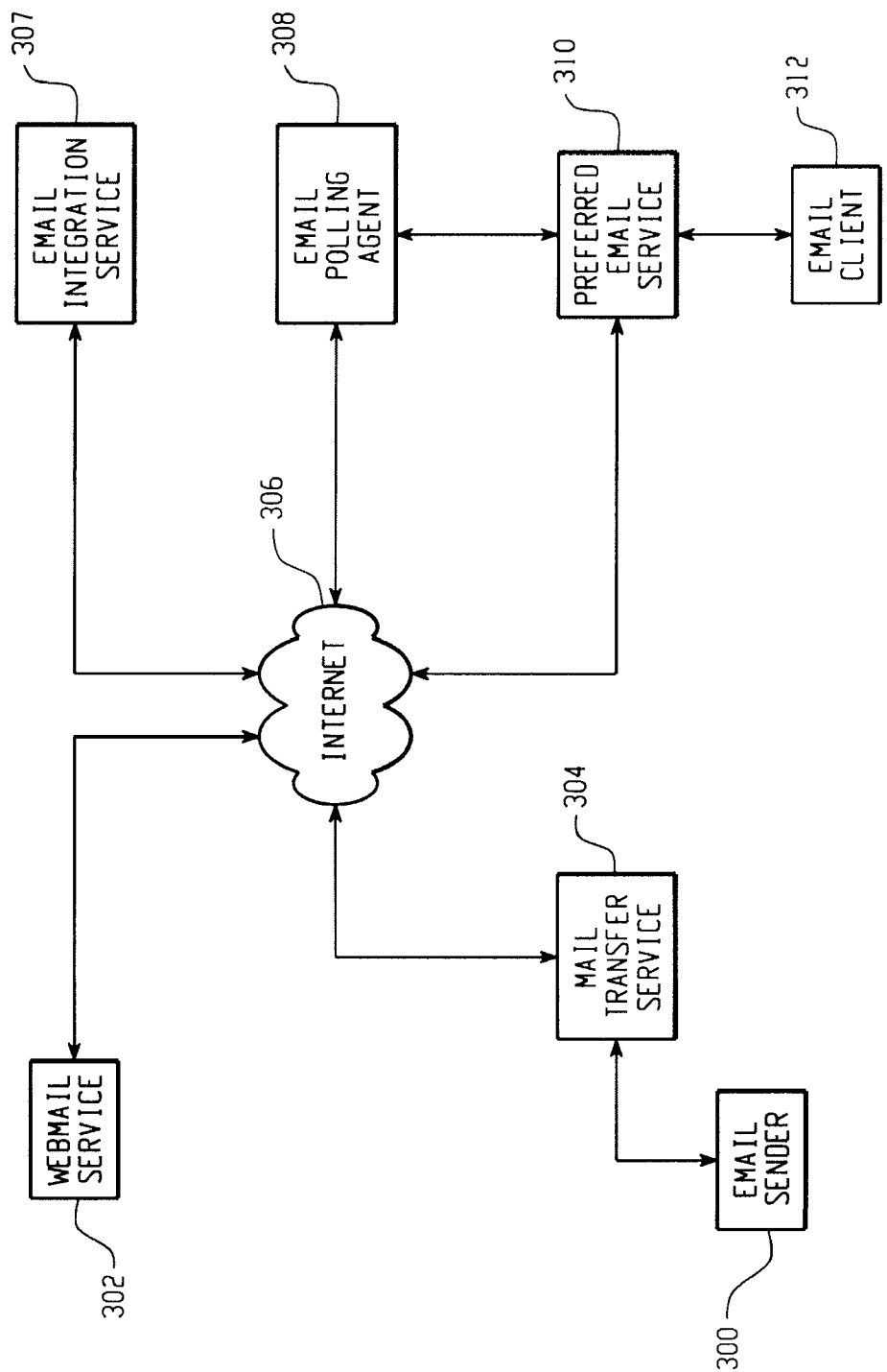
FIG. 3 is a block diagram showing an example electronic mail polling system.

FIG. 3 is a block diagram of an example email polling system for automatically forwarding email to a preferred email service 310. This system includes an email polling agent 308 that is configured to retrieve email messages from a list of email accounts, which may be hosted by different email services 302. For example, the email polling agent 308 may contact an email service 302 at regular intervals via the Internet 306, and retrieve email messages from listed email accounts. In another example, an email service 302 may be configured to transmit a new mail notification to the email polling agent 308 when a message is received for a listed email account, which triggers the email polling agent 308 to retrieve the new email message from the email service 302. In order to interface with the email polling agent 308, email services 302 listed on the email polling agent 308 preferably support a standard method of retrieving email messages via the Internet 306, such as the Post Office Protocol (POP), the Internet Message Access Protocol (IMAP), or others.

In operation, when a mail transfer service 304 sends an email message on behalf of an email sender 300 to a recipient email account on the webmail service 302, the email message is transmitted via the Internet 306, and received and stored by the webmail service 302 in the email account. The next time that the polling agent 308 contacts the webmail service 302 after the email message has been delivered (or responds to a new mail message from the webmail service 302), the polling agent retrieves the new message and forwards the email message to the recipient's preferred email service 310. Thus, the recipient need only use a single email client 312 to access the preferred email service 310 in order to retrieve messages sent to either the preferred email service 310 or to the webmail service 302.

The frequency with which the email polling agent 308 contacts email services 302 may be decreased to minimize the amount of network traffic generated by the polling agent 308. Conversely, the frequency may also be increased to minimize the amount of time between when a message is delivered to an email account that the polling agent 308 is polling and when the message is delivered to the preferred email service 310.

Once the email polling agent 308 has been established, it preferably operates without any input from the email recipient. To set up the email polling agent 308, the email recipient may supply information regarding her email accounts to the email integration server 302, which establishes and configures the email polling agent 308, as described with reference to FIG. 4.

Figure 4:
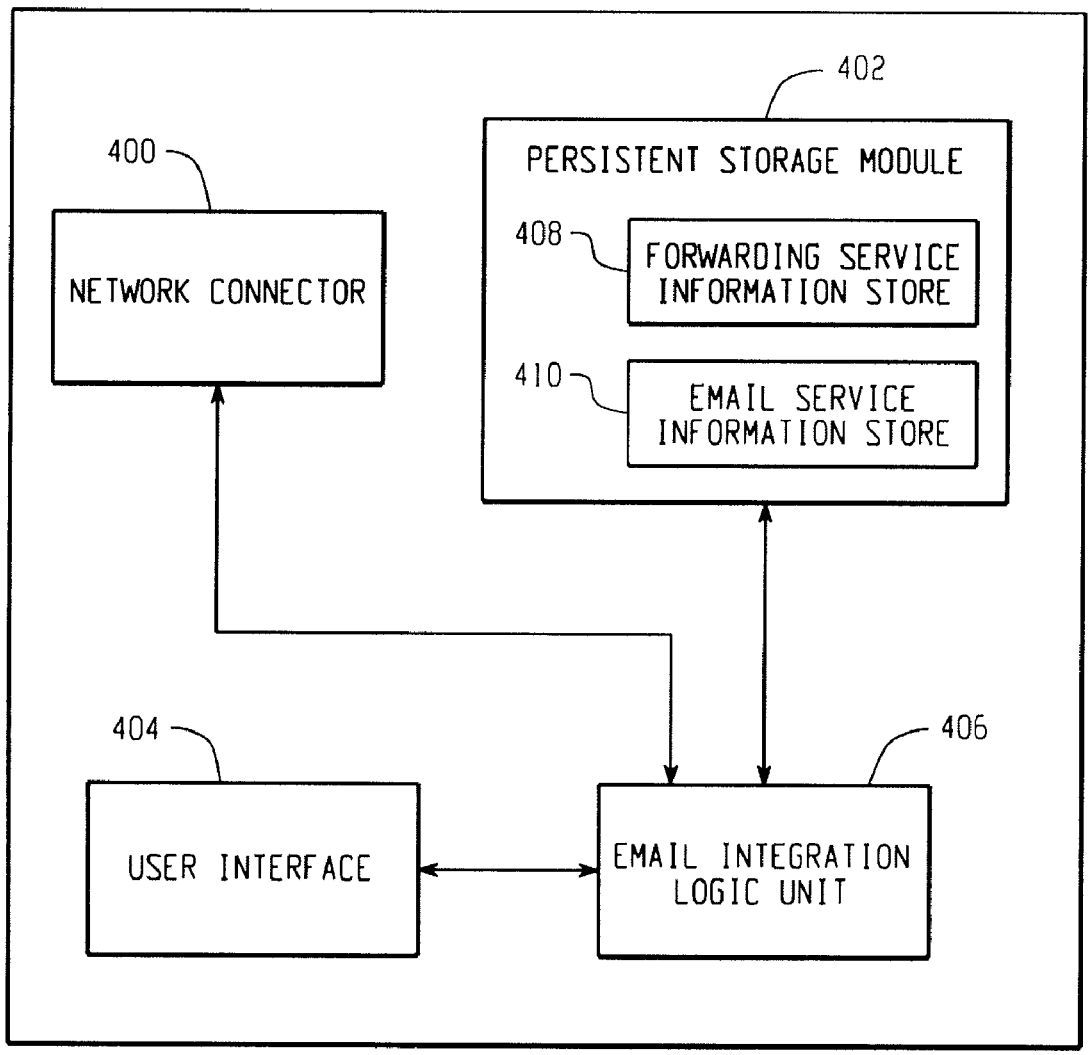
FIG. 4 is a block diagram of an example electronic mail integration service.

FIG. 4 is a block diagram of an example email integration service 201, 307. The email integration service includes a network connector 400, which allows the service to communicate via a computer network, a persistent storage module 402, a user interface 404, and an email integration logic unit 406. The email integration service may, for example, be implemented on a single multi-purpose computer, on a system of multi-purpose computers each of which performs different or identical functions, or on another suitable platform.

The user interface 404 allows users to interact with the email integration service. The user interface 404 may, for example, include a web application that executes on a multi-purpose computer and that may be accessed via the WWW, a server application that can be accessed with a specialized client program, or some other suitable interface. In addition, the user interface 404 may use the network connector 400 to receive connection requests or other information from a computer network.

The persistent storage module 402 is a memory device for storing data used to establish email forwarding rules and email polling agents, and includes a forwarding service information store 408 and an email service information store 410. The persistent storage module 402 may, for example, include a computer hard drive, a database management system running on a plurality of computers, a server implementing the Lightweight Directory Access Protocol, or some other data storage system or device.

The forwarding service information store 408 may include a list of email services that will accept requests for the creation of forwarding rules from the email integration service. For each email service listed, the forwarding service information store 408 may contain a list of email address domain names that are associated with that service. The forwarding service information store may also include information required to connect to the listed email services in order to establish forwarding rules. The email address domain names and connection information may, for example, be populated when the email integration service is configured.

The email service information store 410 may include a list of email services that may be accessed using an Internet email retrieval method, such as the Post Office Protocol (POP). For each email service listed, the email service information store 410 may contain a list of email address domain names that are associated with that service, and a list of the names of email servers that may be accessed to retrieve email from the email service. The email address domain names and email server names may, for example, be populated when the email integration service is configured.

The email integration logic unit 406 is operable to control the components of the email integration service. The email integration logic unit 406 may, for example, be a software module executing on one or more multi-purpose computers, a processing device such as a microprocessor or a digital signal processor (DSP), or some other type of processing device or system.

In operation, the email integration service establishes email forwarding rules and email polling agents. To establish an email forwarding rule or email polling agent, a user may provide account information to the email integration service using the user interface 404. The account information provided to the email integration service may, for example, include an email address, a username and a password for the email account that they wish to integrate. The email integration service may then use the account information to contact the user's email service provider to authenticate that the user is allowed to access a particular account. Once account information has been provided to the email integration service and the email account has been authenticated, the user may request that the email integration service establish a forwarding rule or email polling agent for the email account.

To establish a forwarding rule, the email integration logic unit 406 uses the account information to look up the domain name associated with the email account in the forwarding service information store 408. If the domain name exists in the forwarding service information store 408, then the email integration logic unit 406 retrieves the email service name associated with the domain name and any associated connection information. The email integration logic unit 406 may then use the email service name and connection information to contact the email service provider and request that a forwarding rule be established.

The email integration logic unit 406 may request that an email service create a forwarding rule by sending a message to the email service using the network connector 400. A message sent from the email integration service to an email service provider may, for example, be contained in an email message, in an XML document sent via Hypertext Transfer Protocol (HTTP), or in some other suitable format. The message may contain account information and may specify a preferred email address to which the user would like to have his or her email forwarded. The account information may be used to authenticate the email account, as described above, before establishing the forwarding rule. The preferred email address may be used by the email service provider to establish the forwarding rule. In addition, messages sent from the email integration service to an email service provider may preferably be encrypted to protect any confidential information.

To establish an email polling agent, the email integration logic unit 496 uses the account information to retrieve an email service name, any associated email server names, and any other contact information from the email service information store 410. The email integration logic unit 406 may then create or configure an email polling agent using one of the email server names retrieved from the email service information store 410 and the account information that was provided by the user.

If a domain name for the email service does not exist in the email service information store 410, or if there are no email server names associated with the email service listed in the email service information store 410, then the email integration logic unit 406 may access the user interface 404 to request that the user provide an email server name that can be used to access the email service to be integrated. The email information logic unit 406 may then attempt to validate the provided email server name by connecting to it using the network connector 400 and providing the username and password that has been provided by the user. If the email server validates the username and password, then the email server name that the user provided may be considered to be valid for that user, and may be used to configure the email polling agent.

When a user has provided an email server name that is successfully validated, then the email server name may be considered for addition into the email service information store 410, so that it can be used for future email users who wish to integrate the same email service as is associated with the email server name that was validated. Before adding the email server name, the email integration service may verify that the email server name provided by the user is actually a valid email server name for the email service. This may be accomplished by the email integration service notifying an administrator of the email integration service, and informing the administrator that there is an email server name that is being considered for addition into the email service information store 410. This notification may, for example, be contained in an email message sent to the administrator. The administrator may then indicate whether the email server name should be accepted or rejected. If acceptance is indicated by the administrator, then the email integration logic unit 406 may add the email server name into the email service information store 410. If the email service is already listed in the email integration information store 410, however, then the email server name is added to the list of email servers associated with the email service. If the email service is not already listed, then the email service, the email domain derived from the email address provided by the user, and the email server name may be added to the email service information store 410.

In addition, upon establishing an email forwarding rule or an email polling agent, the email integration service may establish a sent-from address preference on the user's preferred email service. The sent-from preference may specify an email address (i.e., a "FROM" address) that appears as the address that an email has been sent from when the user is sending an email message. For example, the user may establish a sent-from address preference to enable email recipients to reply to the email address associated with either the preferred email service or other integrated email accounts. The sent-from address may, for example, be selected from a list of email addresses that are associated with the email services that have been integrated into the user's preferred email service. In another example, the sent-from address may be dynamically set by the preferred email service based on which email service was the source of the message (e.g., for replies or forwards). The email integration logic unit 406 may then contact the user's preferred email service using the network connector 400 and set the sent-from preference to the email address that the user has specified.

Figure 5:
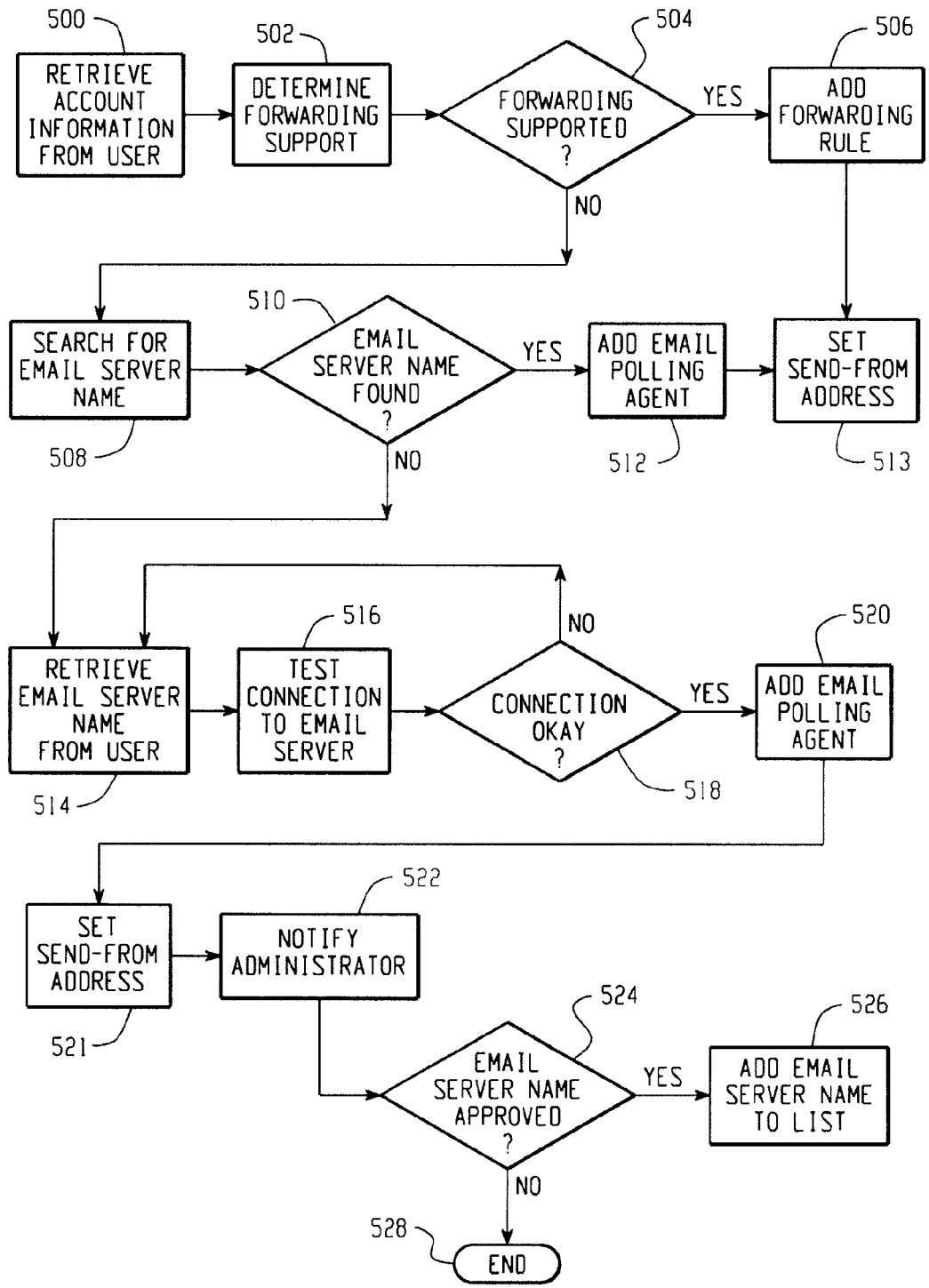
FIG. 5 is a flow diagram illustrating an example method of integrating electronic mail accounts.

FIG. 5 is a flow chart illustrating an example method of integrating email accounts. At step 500 account information is retrieved from a user. The account information may include an email address, a username and a password for the account to be integrated. At step 502, the account information is examined to determine whether the email service that corresponds to the email address supports email forwarding. If email forwarding is supported, then a forwarding rule is added at step 506, and the sent-from address may be set at step 513, both of which are described above.

If the email service does not support email forwarding, then the method continues at step 508. At step 508, the email service information store 410 is searched for the name of an email server that can be polled, as described above. If an email server name is found, then an email polling agent is added at step 512, and the sent-from address may be set at step 513, both of which are described above. If an email server name is not found, then the method continues at step 514.

At step 514, the user is requested to enter the email server name using the user interface 404. Then, at step 516 the validity of the email server name is tested by establishing a connection and providing the username and password when the email server requests authentication information. If the username and password are not accepted, then the method returns to step 514, and the user is asked to re-enter the account information. Otherwise, if the email server accepts the username and password, then the connection is valid, and an email polling agent may be added at step 520 and the sent-from address may be set at step 521, both of which are described above.

At step 522, the email integration logic unit 406 notifies an administrator for the email integration service that a new email server name is being considered for addition into the email service information store 410. The administrator may then indicate whether the new email server name should be accepted. If the administrator approves the email server name, then the method continues at step 526, and the email server name is added to the email service information store 410, as described above. If the administrator rejects the email server name, then the method ends at step 528.

It should be understood that the example method illustrated in FIG. 5 assumes that if email forwarding is available, then the user will want to have email forwarding set-up. In other embodiments, however, the method may also provide the user the option of selecting email polling, even when email forwarding is available.

Figure 6:
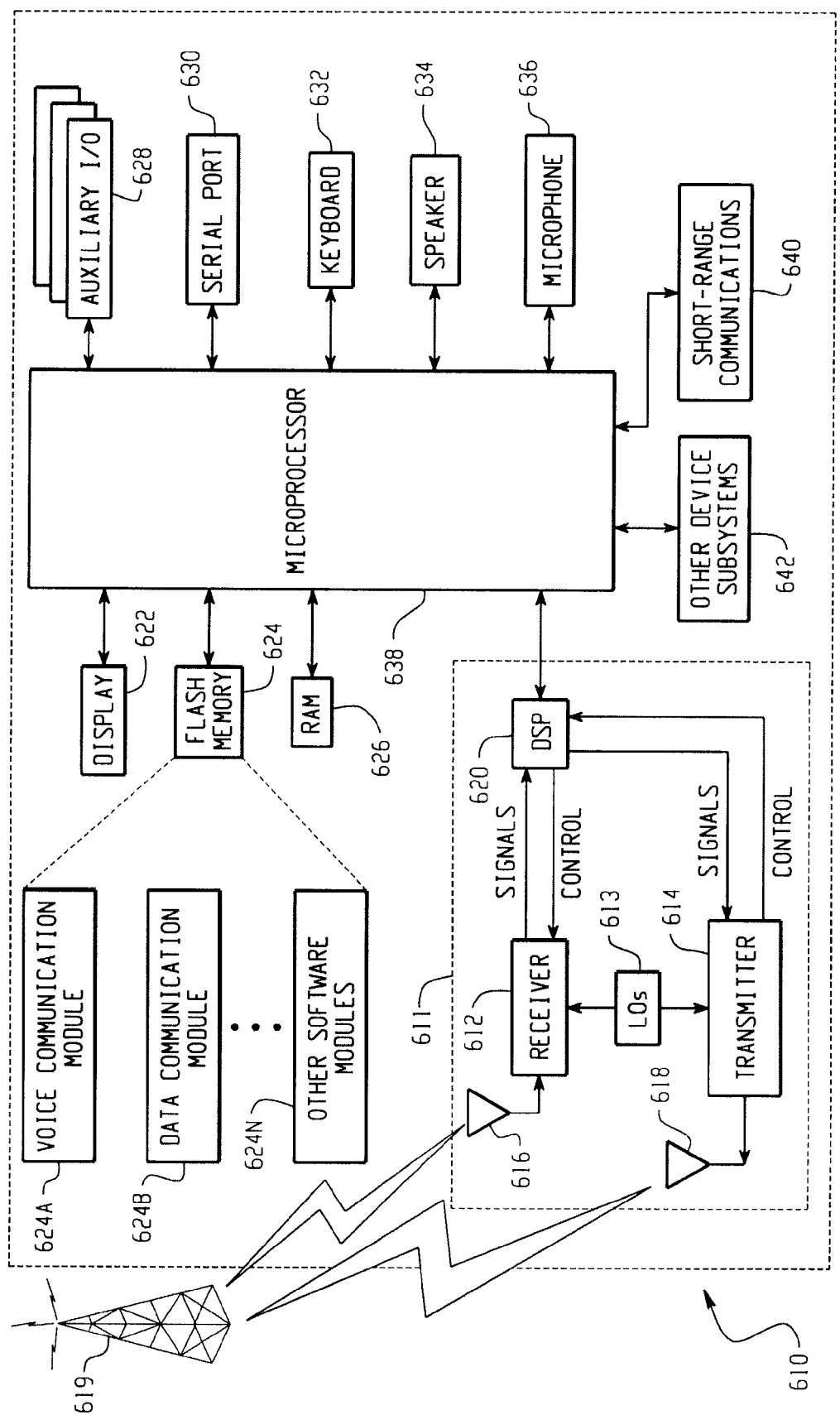
FIG. 6 is a block diagram of an example mobile communication device that may be used to send and receive electronic mail messages.

FIG. 6 is a block diagram of an example mobile communication device 610. The mobile communication device 610 may, for example, be used as an email client 106, 116 for one or more email services, as described above.

The mobile communication device 610 includes a transceiver 611, a microprocessor 638, a display 622, a Flash memory 624, a RAM memory 626, auxiliary input/output (I/O) devices 628, a serial port 630, a keyboard 632, a speaker 634, a microphone 636, a short-range wireless communications sub-system 640, and may also include other device sub-systems 642. The transceiver 611 preferably includes transmit and receive antennas 616, 618, a receiver 612, a transmitter 614, one or more local oscillators 613, and a digital signal processor 620. Within the Flash memory 624, the device 610 preferably includes a plurality of software modules 624A-624N that can be executed by the microprocessor 638 (and/or the DSP 620), including a voice communication module 624A, a data communication module 624B, and a plurality of other operational modules 624N for carrying out a plurality of other functions.

The mobile communication device 610 is preferably a two-way communication device having voice and data communication capabilities. The device 610 may, for example, communicate over a voice network, such as an analog or digital cellular network, and may also communicate over a data network. The voice and data networks are depicted in FIG. 6 by the communication tower 619. These voice and data networks may be separate communication networks using separate infrastructure, such as base stations, network controllers, etc., or may be integrated into a single wireless network.

The communication subsystem 611 is used to communicate with the voice and data network 619, and includes the receiver 612, the transmitter 614, the one or more local oscillators 613 and may also include the DSP 620. The DSP 620 is used to send and receive signals to and from the transmitter 614 and receiver 612, and is also utilized to receive control information from the transmitter 614 and to provide control information to the receiver 612. If the voice and data communications occur at a single frequency, or closely-spaced set of frequencies, then a single local oscillator 613 may be used in conjunction with the transmitter 614 and receiver 612. Alternatively, if different frequencies are utilized for voice communications versus data communications, then a plurality of local oscillators 613 may be used to generate a plurality of frequencies corresponding to the voice and data networks 619. Although two antennas 616, 618 are depicted in FIG. 6, the mobile device 610 could be used with a single antenna structure. Information, which includes both voice and data information, is communicated to and from the communication module 611 via a link between the DSP 620 and the microprocessor 638.

The specific design of the communication subsystem 611 is be dependent upon the communication network 619 in which the device is intended to operate. For example, a device 610 intended to operate in a North American market may include a communication subsystem 611 designed to operate with the Mobitex™ or DataTAC™ mobile data communication networks and also designed to operated with any of a variety of voice communication networks, such as AMPS, TDMA, CDMA, PCS, etc., whereas a device 610 intended for use in Europe may be configured to operate with the General Packet Radio Service (GPRS) data communication network and the GSM voice communication network. Other types of data and voice networks, both separate and integrated, may also be utilized with the mobile device 610.

Depending upon the type of network 619 (or networks), the access requirements for the mobile communication device 610 may also vary. For example, in the Mobitex and DataTAC data networks, mobile devices are registered on the network using a unique identification number associated with each device. In GPRS data networks, however, network access is associated with a subscriber or user of a device 610. A GPRS device typically requires a subscriber identity module ("SIM") to operate the device 610 on a GPRS network. Local or non-network communication functions (if any) may be operable without the SIM device, but the device 610 will be unable to carry out any functions involving communications over the data network 619, other than any legally required operations, such as 911 emergency calling.

After any required network registration or activation procedures have been completed, the mobile communication device 610 may send and receive communication signals, including both voice and data signals, over the network 619 (or networks). Signals received by the antenna 616 from the communication network 619 are routed to the receiver 612, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 620. In a similar manner, signals to be transmitted to the network 619 are processed, including for example modulation and encoding, by the DSP 620 and are then provided to the transmitter 614 for digital to analog conversion, frequency up conversion, filtering, amplification and transmission to the communication network 619 (or networks) via the antenna 618. It should be understood that although a single transceiver 611 is shown in FIG. 6 for both voice and data communications, device 610 may include two distinct transceivers—a first transceiver for transmitting and receiving voice signals, and a second transceiver for transmitting and receiving data signals.

In addition to processing the communication signals, the DSP 620 also provides for receiver and transmitter control. For example, the gain levels applied to communication signals in the receiver 612 and transmitter 614 may be adaptively controlled through automatic gain control algorithms implemented in the DSP 620. Other transceiver control algorithms could also be implemented in the DSP 620 in order to provide more sophisticated control of the transceiver 611.

The microprocessor 638 preferably manages and controls the overall operation of the mobile communication device 610. Low-level communication functions, including at least data and voice communications, are performed through the DSP 620 in the transceiver 611. Other, high-level communication applications, such as a voice communication application 624A, and a data communication application 624B may be stored in the Flash memory 624 for execution by the microprocessor 638. For example, the voice communication module 624A may provide a high-level user interface operable to transmit and receive voice calls between the dual-mode mobile device 610 and a plurality of other voice devices via the network 619. Similarly, the data communication module 624B may provide a high-level user interface operable for sending and receiving data, such as e-mail messages, files, organizer information, short text messages, etc., between the dual-mode mobile device 610 and a plurality of other data devices via the network 619. The microprocessor 638 may also interact with other device subsystems, such as the display 622, Flash memory 624, random access memory (RAM) 626, auxiliary input/output (I/O) subsystems 628, serial port 630, keyboard 632, speaker 634, microphone 636, a short-range communications subsystem 640 and any other device subsystems, generally designated as 642.

Some of the subsystems shown in FIG. 6 perform communication-related functions, whereas other subsystems may provide "resident" or on-device functions. Notably, some subsystems, such as keyboard 632 and display 622 may be used for both communication-related functions, such as entering a text message for transmission over a data communication network, and device-resident functions such as a calculator or task list or other PDA type functions.

Operating system software used by the microprocessor 638 is preferably stored in a persistent store such as Flash memory 624. In addition to the operation system, which controls all of the low-level functions of the device 610, the Flash memory 624 may include a plurality of high-level software application programs, or modules, such as a voice communication module 624A, a data communication module 624B, an organizer module, or any other type of software module 624N. The Flash memory 624 also may include a file system for storing data. These modules are executed by the microprocessor 638 and provide a high-level interface between a user of the device and the device. This interface typically includes a graphical component provided through the display 622, and an input/output component provided through the auxiliary I/O 628, keyboard 632, speaker 634, and microphone 636. The operating system, specific device applications or modules, or parts thereof, may be temporarily loaded into a volatile store, such as RAM 626 for faster operation. Moreover, received communication signals may also be temporarily stored to RAM 626, before permanently writing them to a file system located in the persistent store 624.

An exemplary application module 624N that may be loaded onto the dual-mode device 610 is a personal information manager (PIM) application providing PDA functionality, such as calendar events, appointments, and task items. This module 624N may also interact with the voice communication module 624A for managing phone calls, voice mails, etc., and may also interact with the data communication module for managing e-mail communications and other data transmissions. Alternatively, all of the functionality of the voice communication module 624A and the data communication module 624B may be integrated into the PIM module.

The Flash memory 624 preferably provides a file system to facilitate storage of PIM data items on the device. The PIM application preferably includes the ability to send and receive data items, either by itself, or in conjunction with the voice and data communication modules 624A, 624B, via the wireless network 619. The PIM data items are preferably seamlessly integrated, synchronized and updated, via the wireless network 619, with a corresponding set of data items stored or associated with a host computer system, thereby creating a mirrored system for data items associated with a particular user.

The mobile communication device 610 may also be manually synchronized with a host system by placing the device 610 in an interface cradle, which couples the serial port 630 of the mobile device 610 to the serial port of the host system. The serial port 630 may also be used to enable a user to set preferences through an external device or software application, or to download other application modules 624N for installation. This wired download path may be used to load an encryption key onto the device, which is a more secure method than exchanging encryption information via the wireless network 619.

Additional application modules 624N may be loaded onto the dual-mode device 610 through the network 619, through an auxiliary I/O subsystem 628, through the serial port 630, through the short-range communications subsystem 640, or through any other suitable subsystem 642, and installed by a user in the Flash memory 624 or RAM 626. Such flexibility in application installation increases the functionality of the device 610 and may provide enhanced on-device functions, communication-related functions, or both. For example, secure communication applications may enable electronic commerce functions and other such financial transactions to be performed using the device 610.

When the dual-mode device 610 is operating in a data communication mode, a received signal, such as a text message or a web page download, will be processed by the transceiver 611 and provided to the microprocessor 638, which will preferably further process the received signal for output to the display 622, or, alternatively, to an auxiliary I/O device 628. A device user may also compose data items, such as email messages, using the keyboard 632, which is preferably a complete alphanumeric keyboard laid out in the QWERTY style, although other styles of complete alphanumeric keyboards such as the known DVORAK style may also be used. User input to the device 610 is further enhanced with a plurality of auxiliary I/O devices 628, which may include a thumbwheel input device, a touchpad, a variety of switches, a rocker input switch, etc. The composed data items input by the user may then be transmitted over the communication network 619 via the transceiver 611.

When the dual-mode device 610 is operating in a voice communication mode, the overall operation of the device 610 is substantially similar to the data mode, except that received signals are preferably be output to the speaker 634 and voice signals for transmission are generated by a microphone 636. Alternative voice or audio I/O subsystems, such as a voice message recording subsystem, may also be implemented on the device 610. Although voice or audio signal output is preferably accomplished primarily through the speaker 634, the display 622 may also be used to provide an indication of the identity of a calling party, the duration of a voice call, or other voice call related information. For example, the microprocessor 638, in conjunction with the voice communication module and the operating system software, may detect the caller identification information of an incoming voice call and display it on the display 622.

A short-range communications subsystem 640 may also be included in the mobile communication device 610. For example, the subsystem 640 may include an infrared device and associated circuits and components, or a Bluetooth™ short-range wireless communication module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art. For example, although the examples describe email messages as being transmitted via the Internet, another network may be used. The examples also describe the use of Post Office Protocol and Simple Mail Transfer Protocol, however equivalent protocols may be used. Also, the examples are provided with specific types of email services, such as ISP email and webmail services, however any email service may be used in any of the examples. In addition, variations of the architecture of the email polling agent are possible. For example, a single email polling agent may poll all accounts for all users, one email polling agent per email user may be used, or one email polling agent per email account may be used.

It is claimed:

1. A system for integrating a plurality of active electronic mail (email) accounts, comprising:
a preferred email service to send and receive electronic messages over a wide area network;
a plurality of secondary email services to send and receive electronic messages over the wide area network;
an email integration service coupled to the wide area network to receive and store account information regarding an active email account managed by the preferred email service (primary account) and active email accounts managed by the secondary email services (secondary accounts); and
a polling agent that is configured by the email integration service using the stored account information to configure a polling agent;
the polling agent using the stored account information to communicate periodically with the secondary email services to determine if electronic messages have been received by the secondary accounts since the polling agent last communicated with the secondary email services and, if so, to retrieve the received messages from the secondary email services and forward the retrieved messages to the primary account.

2. The system of claim 1, wherein one or more of the secondary email services is an Internet service provider (ISP) email service.

3. The system of claim 1, wherein one or more of the secondary email services is a webmail service.

4. The system of claim 1, wherein the email integration service configures the secondary email services to transmit a new mail notification to the polling agent.

5. The system of claim 4, wherein the polling agent retrieves an email message from one or more of the secondary accounts in response to receiving the new mail notification.

6. The system of claim 1, wherein a user may adjust an interval controlling how frequently the polling agent communicates with the secondary email services to retrieve electronic messages from the secondary accounts and forward the retrieved messages to the primary account.

7. A system for integrating a plurality of active electronic mail (email) accounts, comprising:
a preferred email service to send and receive electronic messages over a wide area network;
a plurality of secondary email services to send and receive electronic messages over the wide area network;
an email integration service coupled to the wide area network to receive and store account information regarding an active email account managed by the preferred email service (primary account) and active email accounts managed by the secondary email services (secondary accounts), the email integration service using the stored account information to configure a forwarding rule; and
the forwarding rule maintained by the secondary email services and configured to cause the secondary email services to automatically redirect electronic messages sent to the secondary accounts to the primary account.

8. The system of claim 7, further comprising:
a polling agent configured to communicate periodically with one or more of the secondary email services using the stored account information to retrieve electronic messages sent to the secondary accounts and to forward the retrieved electronic messages to the primary account;
wherein the email integration service configures the polling agent if it is determined that one or more of the secondary email services do not support email forwarding.

9. The system of claim 8, wherein the email integration service automatically configures the polling agent if the secondary email services do not support email forwarding, without requiring any action by a user.

10. A method of integrating a plurality of secondary email services that manage active email accounts and a preferred email service that manages an active email account:
receiving account information at an email integration service regarding the active email account managed by the preferred email service (primary account) and the active email accounts managed by the secondary email services (secondary accounts);
storing the account information; and
the email integration service using the stored account information for the secondary accounts to establish forwarding rules maintained by the secondary email services, the forwarding rules being configured to cause the secondary email services to automatically redirect electronic messages sent to the secondary accounts to the primary account;
wherein electronic messages sent to the secondary accounts are forwarded to the primary account by the email integration service.

11. The method of claim 10, further comprising:
contacting the secondary email services and authenticating the account information.

12. The method of claim 10, further comprising:
establishing a sent-from email address to be included as a sender address in email messages transmitted by the preferred email service.

13. The method of claim 12, wherein the sent-from address is selected by a user of the preferred email service.

14. The method of claim 12, wherein if the email message being transmitted from the preferred email service relates to a previous email message received by one of the secondary accounts and forwarded to the primary account, then the sent-from address being dynamically set by the preferred email service to correspond with the one of the secondary accounts.

15. The method of claim 10, wherein forwarding of electronic messages from the secondary accounts to the primary account permits a user associated with the primary account and the secondary accounts to receive electronic messages sent to either the primary account or the secondary accounts by accessing only the primary account.

16. A method of integrating a plurality of secondary email services that manage active email accounts and a preferred email service that manages an active email account:
receiving account information at an email integration service regarding the active email account managed by the preferred email service (primary account) and the active email accounts managed by the secondary email services (secondary accounts);
storing the account information; and
the email integration service using the stored account information for the secondary accounts to establish a polling agent, the polling agent being configured to use the stored account information to communicate periodically with the one or more secondary email services to determine if electronic messages have been received by the secondary accounts since the polling agent last communicated with the one or more secondary email services and, if so, to retrieve the received messages from the one or more secondary email services and forward the retrieved messages to the primary account;

wherein electronic messages sent to the secondary accounts are forwarded to the primary account by the email integration service.

17. The method of claim 16, further comprising:
contacting the secondary email services and authenticating the account information.

18. The method of claim 16, further comprising:
establishing a sent-from email address to be included as a sender address in email messages transmitted by the preferred email service.

19. The method of claim 18, wherein the sent-from address is selected by a user of the preferred email service.

20. The method of claim 18, wherein if the email message being transmitted from the preferred email service relates to a previous email message received by one of the secondary accounts and forwarded to the primary account, then the sent-from address being dynamically set by the preferred email service to correspond with the one of the secondary accounts.

21. The method of claim 16, wherein forwarding of electronic messages from the secondary accounts to the primary account permits a user associated with the primary account and the secondary accounts to receive electronic messages sent to either the primary account or the secondary accounts by accessing only the primary account.

* * * * *